(12) United States Patent
Silva et al.

(10) Patent No.: US 6,780,961 B2
(45) Date of Patent: Aug. 24, 2004

(54) METHOD OF MAKING POLYCARBONATE

(75) Inventors: James Manio Silva, Clifton Park, NY (US); Pierre-Andre Bui, Clifton Park, NY (US); Thomas Joseph Fyvie, Schenectady, NY (US); David Michel Dardaris, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/271,363

(22) Filed: Oct. 16, 2002

(65) Prior Publication Data
US 2004/0077820 A1 Apr. 22, 2004

(51) Int. Cl.[7] .............................................. C08G 64/00
(52) U.S. Cl. ..................... 528/196; 422/131; 422/135; 502/200; 502/208; 528/198; 264/276.1; 264/219
(58) Field of Search ................................ 422/131, 135; 502/200, 208; 528/196, 198; 264/276.1, 219

(56) References Cited

U.S. PATENT DOCUMENTS

| | | | |
|---|---|---|---|
| 3,530,094 A | 9/1970 | Schnell et al. | |
| 3,974,126 A | 8/1976 | Narita et al. | |
| 4,959,456 A | 9/1990 | Ashida et al. | |
| 5,037,937 A | * 8/1991 | Komatsu et al. | ............ 528/174 |
| 5,037,942 A | 8/1991 | Hunt et al. | |
| 5,182,361 A | 1/1993 | Maria van Hout et al. | |
| 5,391,693 A | * 2/1995 | Nakae | ........................ 528/201 |
| 6,414,178 B1 | * 7/2002 | Silva et al. | ..................... 560/8 |

* cited by examiner

Primary Examiner—Terressa Boykin
(74) Attorney, Agent, or Firm—Andrew J. Caruso; Patrick K. Patnode

(57) ABSTRACT

A new method of converting oligomeric chloroformates to high molecular weight polycarbonate is presented. By carefully controlling the relative concentrations and amounts of hydroxyl and chloroformate groups present in the oligomeric polycarbonate, the method of the invention provides for the efficient preparation of polycarbonate while minimizing phosgene usage. The product polycarbonates prepared by the method of the invention are fully capped with no additional phosgene required beyond that needed to prepare the oligomeric chloroformate starting material. The method of the present invention provides polycarbonates having non-detectable levels (<5 ppm) of aromatic hydroxyl endgroups, low polydispersity, and low levels of residual monomer and endcap, thereby obviating the need for monomer and endcap recycle.

25 Claims, No Drawings

METHOD OF MAKING POLYCARBONATE

BACKGROUND OF THE INVENTION

This invention relates to a method for the interfacial polymerization of oligomeric chloroformates to product polycarbonates. The invention further relates to an efficient process for the continuous interfacial polymerization of oligomeric chloroformates to yield an aromatic polycarbonate.

Polycarbonates, prized for their transparency, toughness and relatively low cost, are produced globally on a scale of well over a billion pounds annually. Given the importance of polycarbonates in the fiercely competitive worldwide materials marketplace it is not surprising that new and more efficient routes to polycarbonates are earnestly sought. Numerous methods for polycarbonate preparation are well known, particularly for aromatic polycarbonates such as bisphenol A polycarbonate. Aromatic polycarbonates have been, and are currently prepared by two principal routes, the "melt" method and the "interfacial" method. The interfacial method is characterized typically by the reaction of a bisphenol with phosgene under interfacial conditions, that is, conditions generally comprising reaction in a water immiscible solvent such as methylene chloride in the presence of an aqueous solution of an acid acceptor such as an alkali metal hydroxide and a catalyst which is typically a tertiary amine such as triethylamine or a tertiary amine in combination with one or more phase transfer catalysts, such as tetrabutylammonium bromide.

One variation on the interfacial approach to polycarbonate preparation has been the bischloroformate method, sometimes referred to as the "BCF" method, in which the chloroformate groups of a low molecular weight oligomeric chloroformate are selectively hydrolyzed under conditions such that, when the chloroformate group is hydrolyzed thereby affording a negatively charged oxygen atom linked to the oligomer, the negatively charged oxygen atom reacts with one of the remaining chloroformate groups at a rate substantially faster that the rate at which the chloroformate groups are undergoing hydrolysis. The result of this rate differential is that the oligomeric chloroformate undergoes chain extension and polycarbonate having sufficient molecular weight to be useful is produced. While substantial research effort has been expended in the development of this "BCF" approach to polycarbonate and impressive achievements brought about, there remain opportunities for further improvement of this process. For example, it would be highly desirable to provide a method in which an oligomeric chloroformate could be continuously converted to high molecular weight product polycarbonate, and, without recourse to resubjecting the product to additional phosgene beyond that employed in the preparation of the oligomeric polycarbonate, afford a product polycarbonate which contained only very low levels of hydroxy groups, starting monomer and chainstopper. Frequently, however, the "BCF" approach affords a product polycarbonate which has an undesirably high level of hydroxy groups, contains high levels of residual monomer and chainstopper, and is generally unsuited for use in the continuous manufacture of polycarbonate. The present invention solves these and other problems which until now have long inhered to the "BCF" approach to polycarbonate manufacture.

BRIEF SUMMARY OF THE INVENTION

In one aspect, the present invention provides a method of making an aromatic polycarbonate, said method comprising contacting under interfacial polymerization conditions a solution comprising an oligomeric chloroformate with an acid acceptor and a catalyst, said oligomeric chloroformate solution having a gross concentration of chloroformate groups, a total concentration of aromatic hydroxyl groups, and a net concentration of chloroformate groups, said net concentration of chloroformate groups being the difference between the gross concentration of chloroformate groups and the total concentration of aromatic hydroxyl groups, said net concentration of chloroformate groups having a value of greater than about 0.04 moles of chloroformate group per liter of said solution.

In another aspect, the present invention relates to polycarbonates prepared by the method of the present invention and articles comprising said polycarbonates.

DETAILED DESCRIPTION OF THE INVENTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of at least one diaryl carbonate with at least one dihydroxy aromatic compound.

"BPA" is herein defined as bisphenol A and is also known as 2,2-bis(4-hydroxyphenyl)propane, 4,4'-isopropylidenediphenol and p,p-BPA.

As used herein, the term "bisphenol A polycarbonate" refers to a polycarbonate in which essentially all of the repeat units comprise a bisphenol A residue.

As used herein, the term "product polycarbonate" refers to a polycarbonate product having a weight average molecular weights, $M_w$, greater than 15,000 daltons.

As used herein, "oligomeric" indicates a polymeric species having multiple repeat units and a weight average molecular weights, $M_w$, less than 15,000 daltons.

As used herein the term "percent endcap" refers to the percentage of polycarbonate chain ends which are not hydroxyl groups. In the case of bisphenol A polycarbonate prepared from diphenyl carbonate and bisphenol A, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

As used herein, the terms "chainstopper", "chainstopping agent", "endcapping agent" and "endcap" have the same meaning and refer to a monofunctional species such as p-cumylphenol used to control the molecular weight of a product polycarbonate during the polymerization reaction in which the product polycarbonate is formed.

As used herein, the terms "hydroxy group" and "hydroxyl group" have the same meaning and refer to an OH group attached to an organic molecule which may have any molecular weight in a range between the molecular weight of methanol and that of the highest molecular weight polycarbonates achievable. Typically, as used herein, the terms refer to OH groups which are attached to the starting oligomeric chloroformate, or OH groups which are attached to the product polycarbonate.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group, a phenethyl group or a naphthylmethyl group. The term also includes groups comprising both aromatic and cycloaliphatic groups for example 4-cyclopropylphenyl and 1,2,3,4-tetrahydronaphthalen-1-yl.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl cyclohexyl, 2-cyclohexylethy-1-yl, tetrahydrofuranyl and the like.

The present invention relates to a method for preparing polycarbonate in which an oligomeric chloroformate in solution is reacted under interfacial conditions with an acid acceptor and a catalyst to form a high molecular weight polycarbonate. The oligomeric chloroformate comprises both hydroxyl end groups and chloroformate (ClOCO) end groups. It has been discovered that, surprisingly, when the concentrations of chloroformate and hydroxy endgroups present in a solution of an oligomeric chloroformate undergoing polymerization under interfacial conditions are suitably balanced, the product polycarbon ate possesses improved properties, such as containing a reduced amount of residual monomer and chainstopping agent. Additionally, the product polycarbonate so prepared contains a reduced level of hydroxy endgroups. By suitably balanced, it is meant that both the relative amounts of hydroxy and chloroformate groups and the actual concentrations of hydroxy and chloroformate groups in the solution undergoing polymerization are such that the "net concentration" of chloroformate groups present in the oligomeric chloroformate solution at the outset of the polymerization reaction is greater than about 0.04 moles of chloroformate groups per liter of solution. "Net concentration" as used herein is defined as the difference between the total concentration of chloroformate groups (gross concentration) and the concentration of hydroxy groups present in the oligomeric chloroformate solution at the outset of the polymerization reaction. It is preferred that the net concentration of chloroformate groups be in a range between about 0.04 and about 1.2 moles of chloroformate groups per liter of solution. It should be emphasized that "net concentration" is based on the difference between the "gross concentration" of chloroformate groups and the concentration of hydroxy groups present in the oligomeric chloroformate solution and that these concentrations are based upon the volume of the solution consisting essentially of the water immiscible solvent containing the oligomeric chloroformate at the outset of the reaction.

As noted, the polymerization is conducted under interfacial polymerization conditions, meaning the reaction mixture comprises water, at least one solvent which is not miscible with water, an acid acceptor, a catalyst, and the oligomeric chloroformate undergoing polymerization.

Suitable water-immiscible solvents which can be used under interfacial reaction conditions of the present invention are, for example, chlorinated aliphatic hydrocarbons, such as methylene chloride, carbon tetrachloride, dichloroethane, trichloroethane and tetrachloroethane; substituted aromatic hydrocarbons such as chlorobenzene, o-dichlorobenzene, and the various chlorotoluenes. The chlorinated aliphatic hydrocarbons, especially methylene chloride, are preferred.

Suitable acid acceptors include alkali metal or alkaline earth metal hydroxides which can be employed as acid acceptors under interfacial reaction conditions are, for example, lithium hydroxide, sodium hydroxide, potassium hydroxide, and calcium hydroxide. Sodium and potassium hydroxides, and particularly sodium hydroxide are preferred.

The catalyst comprises one or more amine catalysts having structure I

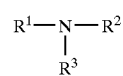

I wherein $R^1$–$R^3$ are independently a bond, $C_1$–$C_{20}$ aliphatic radical, $C_4$–$C_{20}$ cycloalkylaliphatic radical, or a $C_4$–$C_{20}$ aromatic radical. Amines having structure I are illustrated by triethylamine, tributyl amine, N-butyl-N,N-dimethylamine, Hönig's Base, N-methylpiperidine, 4-(N,N-dimethylamino) pyridine, N-ethylmorpholine, 1,4-diazabicyclo[2.2.2]octane, 1,5-diazabicyclco[4.3.0]non-5-ene, and the like.

The catalyst may further comprise a quaternary ammonium compound having structure II

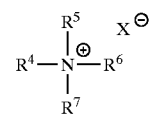

II wherein $R^4$–$R^7$ are independently a bond, a $C_1$–$C_{20}$ aliphatic radical, $C_4$–$C_{20}$ cycloaliphatic radical , or a $C_4$–$C_{20}$ aromatic radical; and $X^-$ is an organic or inorganic anion. Typically the anion $X^-$ is selected from the group consisting of hydroxide, halide, carboxylate, phenoxide, sulfonate, sulfate, carbonate, and bicarbonate. Hydroxide is frequently preferred. Quaternary ammonium salts having structure II are illustrated by tetramethylammonium hydroxide, tetrabutylammonium hydroxide, and the like.

In an alternate embodiment of the present invention the catalyst further comprises a quaternary phosphonium compound having structure III

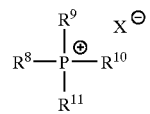

III wherein $R^8$–$R^{11}$ are independently a bond, a $C_1$–$C_{20}$ aliphatic radical, $C_{4-20}$ cycloaliphatic radical , or a $C_4$–$C_{20}$ aromatic radical; and X⁻ is an organic or inorganic anion. Typically the anion X⁻ is selected from the group consisting of hydroxide, halide, carboxylate, phenoxide, sulfonate, sulfate, carbonate, and bicarbonate. Hydroxide is frequently preferred. Quaternary phosphonium salts having structure III are illustrated by tetrabutylphosphonium hydroxide, tetraoctylphosphonium hydroxide, tetrabutylphosphonium acetate, and the like.

In structures II and III, the anion X⁻ is typically an anion selected from the group consisting of hydroxide, halide, carboxylate, phenoxide, sulfonate, sulfate, carbonate, and bicarbonate. With respect to catalysts comprising onium salts such as II and III, where X⁻ is a polyvalent anion such as carbonate or sulfate it is understood that the positive and negative charges in structures II and III are properly balanced. For example, in tetrabutylphosphonium carbonate where $R^8$–$R^{11}$ in structure III are each butyl groups and X⁻ represents a carbonate anion, it is understood that X⁻ represents ½ ($CO_3^{-2}$).

The oligomeric chloroformate used according to the method of the present invention may be an oligomeric chloroformate comprising either aromatic or aliphatic repeat units, or a combination thereof. Oligomeric chloroformates comprising aliphatic repeat units are exemplified by oligomeric chloroformates prepared from an aliphatic diols, for example, an oligomeric chloroformate having a degree of oligomerization of about 10 prepared from 1,6-hexanediol.

Oligomeric chloroformates comprising aromatic repeat units may be prepared from almost any dihyroxy aromatic compound either singly or as mixtures of dihydroxy aromatic compounds. Dihydroxy aromatic compounds are illustrated by bisphenols such as BPA and dihydroxybenzenes, for example resorcinol, hydroquinone, and methyl hydroquinone.

In one embodiment of the present invention the oligomeric chloroformate comprises repeat units having structure IV

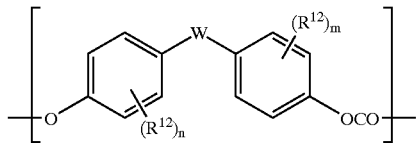

IV wherein $R^{12}$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

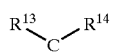

wherein $R^{13}$ and $R^{14}$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{12}$ aralkyl, $C_5$–$C_{20}$ cycloalkyl groups or a combination thereof.

Oliogomeric chloroformates comprising structural units IV are typically prepared from bisphenols such as bisphenols having structure V

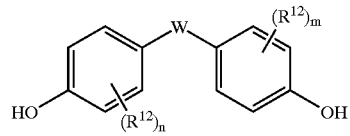

V wherein $R^{12}$, n, m, and W are defined as in structure IV.

Bisphenols having structure V are exemplified by bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane; 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene; and 1,4-bis(2-(4-hydroxy-3-methylphenyl)-2-propyl)benzene.

Typically, oligomeric chloroformates are prepared by reacting a bisphenol having structure V with excess phosgene under interfacial reaction conditions in which the pH is somewhat lower (pH from about 7 to about 9) than the pH typically employed in interfacial polymerization reactions of bisphenols with phosgene (pH between about 10 and about 12). U.S. Pat. Nos. 4,737,573 and 5,973,103 exemplify continuous and batch preparation of oligomeric chloroformate synthesis under pH-controlled and ratio-controlled caustic addition. Excess phosgene means an amount of phosgene which represents between about 3 and about 200 mole percent excess phosgene relative to the number of moles of bisphenol employed. It is frequently desirable to include a chain stopper during the preparation of the oligomeric chloroformate. Alternatively, the chain stopper may be added during polymerization of the oligomeric chloroformate. In some embodiments, a portion of the chain stopper may be added during the preparation of the oligomeric chloroformate and a second portion added during polymerization of the oligomeric chloroformate. In embodiments in which the chain stopper is added to the oligomeric chloroformate mixture it is advantageous to add said chainstopper only after the oligomeric chloroformate mixture is essentially phosgene-free, meaning that the organic solution contains less than about 10 ppm phosgene based on the weight of organic solution. The chain stopper is typically a monofunctional phenol such as p-cumylphenol. Monofunctional phenols having structure VI

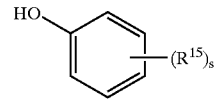

VI wherein $R^{15}$ is a $C_1$–$C_{20}$ aliphatic radical, a $C_4$–$C_{20}$ aromatic radical, or a $C_3$–$C_{20}$ cycloaliphatic radical, and s is an integer from 0–5, are suitable for use in the preparation of oligomeric chloroformates. The amount of chainstopper used typically corresponds to between about 0.1 and about 7 mole percent based on the number of moles of bisphenol used.

Suitable monofunctional phenols are exemplified by, but not limited to, the following: phenol; 4-phenylphenol, cardanol, eugenol, 4-t-butylphenol, p-cumylphenol; 3,5-dimethylphenol, and 2,4-dimethylphenol.

Although the method of the instant invention may be practiced in any suitable reaction vessel, such as a stirred tank reactor, or in any combination of reaction vessels in a batch or semi-batch process, the method is especially well suited for use in one or more continuous flow reactors. The flow reactor is not particularly limited and may be any reactor system which provides for the "upstream" introduction of the reactants (oligomeric chloroformate and acid acceptor), catalyst, and solvent and water, and the "downstream" removal of product polycarbonate. Suitable flow reactor systems include tubular reactors, continuous stirred tank reactors (CSTRs), loop reactors, column reactors, and combinations thereof. The flow reactor may comprise a series of flow reactor components, as for example, a series of CSTRs arrayed such that the effluent from a first CSTR provides the input for a second CSTR and so forth. Combinations of the various flow reactor components are illustrated by a first CSTR coupled to a downstream column reactor where the output of the CSTR represents the feed to the column reactor. Additionally, the flow reactor used according to the method of the present invention may comprise flow reactor components arrayed in a parallel or network fashion, for example, as where the reactants are introduced into a single CSTR and the CSTR product is introduced into a parallel array of two or more tubular reactors. The advantage of this configuration is that multiple grades could be made simultaneously by, for example, introducing different proportions of chain stopper into the feed of each tubular reactor. In one embodiment of the present invention the flow reactor comprises a series of tubular reactors. In an alternate embodiment the flow reactor comprises a series of continuous stirred tank reactors. The reactants may be introduced into the flow reactor system through one or more feed inlets attached to the flow reactor system. Typically, it is preferred that the reactants, solvent and water be introduced into the flow reactor through at least two feed inlets, for example where a solution of the oligomeric chloroformate in an organic solvent such as methylene chloride and aqueous alkali metal hydroxide, and a solution of a catalyst in an organic solvent are introduced through separate feed inlets at or near the upstream end of a tubular reactor. Alternative arrangements wherein one or more of the reactants is introduced through multiple feed inlets at various points along the flow reactor are also possible. Typically, the relative amounts of the reactants present in the flow reactor are controlled by the rates at which they are introduced. For example, a reactant can be introduced into the flow reactor through pumps calibrated to deliver a particular number of moles of said reactant per unit time.

In one embodiment, the method of the present invention comprises the following steps:

Step (a) continuously introducing into a flow reactor a solution comprising an oligomeric chloroformate, said solution having a gross concentration of chloroformate groups, a total concentration of aromatic hydroxyl groups, and a net concentration of chloroformate groups, said net concentration of chloroformate groups being the difference between the gross concentration of chloroformate groups and the total concentration of aromatic hydroxyl groups, said net concentration of chloroformate groups having a value of greater than about 0.04 moles of chloroformate group per liter of said solution;

Step (b) continuously introducing into said flow reactor an acid acceptor and a catalyst; and Step (c) continuously removing an effluent comprising and product aromatic polycarbonate.

In one embodiment said net concentration of chloroformate groups is in a range between about 0.04 and about 0.12 moles of chloroformate group per liter of said solution.

In one embodiment said flow reactor system comprises at least one tubular reactor, at least one continuous stirred tank reactor, at least one loop reactor, at least one column reactor, or a combination thereof.

In yet a further embodiment, the present invention provides a method of preparing bisphenol A polycarbonate, said method comprising Step (a) continuously introducing into a flow reactor a methylene chloride solution comprising an oligomeric chloroformate, said solution having a gross concentration of chloroformate groups, a total concentration of aromatic hydroxyl groups, and a net concentration of chloroformate groups, said net concentration of chloroformate groups being the difference between the gross concentration of chloroformate groups and the total concentration of aromatic hydroxyl groups, said net concentration of chloroformate groups having a value between 0.04 and about 0.12 moles of chloroformate group per liter of said solution, said oligomeric chloroformate comprising repeat units having structure VII

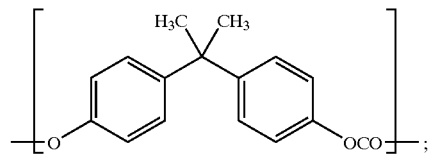

Step (b) continuously introducing into said flow reactor a solution of sodium hydroxide and water, and a solution of triethylamine catalyst in methylene chloride; and Step (c) continuously removing an effluent comprising a product aromatic polycarbonate.

In one embodiment of the present invention no chainstopper is used in the preparation of the oligomeric chloroformate. However, chainstopper, an acid acceptor, a catalyst, and an essentially phosgene-free oligomeric chloroformate comprising repeat units IV are introduced into a flow polymerization reactor and continuously polymerized under interfacial conditions.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) using polystyrene (PS) molecular weight standards.

Chloroformate oligomers were prepared in a continuous stirred tank reactor (CSTR) using "BPA oil" as the bisphenol feed. "BPA oil" was prepared by charging BPA flakes (4 Kg) and deionized water (4 Kg) to a five gallon pressurized reaction vessel equipped with a heater, agitator, headspace nitrogen inlet, pressure gauge, and product removal port located at the base of the reactor. Prior to mixing the BPA with the water, the water was sparged with an inert gas. The vessel was sealed and the mixture of solid BPA and water was heated without agitation to 120° C. for about 2 hours. After 2 hours most of the bisphenol solid had melted giving an essentially two phase system consisting of two liquid phases, a water-rich upper phase and a BPA-rich lower phase. The BPA-rich phase is referred to as "BPA oil". If less water is used then only a single phase results, bottom BPA oil phase. The agitator was then turned on in order to facilitate the melting of any remaining solid BPA. The agitator was operated at a low speed, about 30 rpm, in order to prevent emulsification of the BPA oil and water-rich phases. The agitator had two impellers, each equipped with four pitched blades. A nitrogen atmosphere was maintained over the reaction mixture at a pressure sufficient to prevent the water from boiling. The agitation was optionally continued or discontinued when the BPA oil phase was fed to the reactor. The transfer lines were heated and maintained at 125° C.

Example 1

Preparation of Chloroformate Oligomers "A", "B" and "C".

Operating conditions employed for the preparation of a methylene chloride solution comprising chloroformate (CF) oligomer "A" are given in Table 1 below. Methylene chloride solutions comprising oligomeric chloroformates "B" and "C" were prepared analogously.

TABLE 1

OPERATING CONDITIONS CF-OLIGOMER "A" PREPARATION

| 1500 mL | reactor volume |
|---|---|
| 4.20 | mole % p-cumylphenol endcap (relative to moles BPA derived repeat units) |
| 200 | concentration in ppm of triethylamine (TEA) in $CH_2Cl_2$ feed |
| 0.2 | weight fraction water in BPA oil feed |
| 20 | concentration of NaOH feed expressed in weight percent NaOH |
| 5.15 | gram/minute phosgene feed rate |
| 18.9 | gram/minute NaOH solution feed rate |
| 14.0 | gram/minute BPA Oil feed rate |
| 66.9 | gram/minute $CH_2Cl_2$/TEA feed rate |

The reactor comprised a 1.5 liter glass vessel equipped with a recirculation loop and associated recirculation pump, a stirrer with a dual flat-blade impeller, and a reflux condenser. The reactor had feed ports for the addition of phosgene (subsurface addition near the impeller), caustic (above surface addition), methylene chloride and triethylamine solution, and BPA oil (80 wt % BPA and 20 wt % $H_2O$). The condenser was vented to a caustic scrubber, which was in turn vented to the atmosphere in a well ventilated fume hood. The methylene chloride feed containing triethylamine was introduced into the reactor as a feed stream delivered through the reactor headspace. BPA oil was introduced into the reactor via an inlet located on the recirculation loop. The choice of this addition point provided backpressure on the BPA oil feed system, which prevented flashing of water vapor from the BPA oil solution and thereby prevented solidification of BPA in the transfer line.

Other feed options were tested, such as feeding the oil mixture above the reactor liquid surface. This resulted in plugging, due to flashing of water vapor and solidification of the BPA in the transfer line. Initially the reactor contained methylene chloride and water in a volume ratio of about 2 to 1, the total volume of the mixture of methylene chloride and water in the reactor being about 1 liter. The recirculation loop pump was then started and subsequently the feeds were started in the following order; first methylene chloride, then BPA oil, then caustic (20 weight percent sodium hydroxide), and finally phosgene. All feeds were added under flow control, meaning that the amounts of each of the reactants was controlled by the rate said reactants were introduced. The reactor pH was monitored but not controlled. The reactor pressure was maintained at just slightly over atmospheric pressure by the water column present in the in the vent scrubber. The volume of the reaction mixture within the reactor was maintained by continuous removal of a portion of contents of the reactor via an outlet located on the recirculation loop. The outlet was located at a point downstream from the recirculation pump and upstream of the recirculation loop feed inlet through which the BPA oil was introduced. The product oligomeric chloroformate was collected into IN HCl to prevent any further reaction. Data are given in Table 2 which characterize the product oligomeric chloroformate "A" in terms of gross chloroformate ("Gross [CF]") and net chloroformate ("Net [CF]") concentrations and weight average molecular weight ($M_w$). In Table 2 the molecular weight of the oligomeric chloroformate "A" is given as the weight average molecular weight ($M_w$) as measured by gel permeation chromatography using polystyrene molecular weight standards. "Net" and "Gross" chloroformate concentrations are expressed in moles of chloroformate group (ClCOO) per liter of the solution of the oligomeric chloroformate in methylene chloride solution. Additional data for oligomeric chloroformates "A", "B" and "C" are provided in Table 3.

TABLE 2

CHARACTERIZATION OF OLIGOMERIC CHLOROFORMATE "A"

| 7,080 daltons | $M_w$ (polystyrene standards) |
|---|---|
| 0.048 M | Net Chloroformate Level |
| 0.179 M | Gross Chloroformate Level |

Examples 2–11

Polymerization of Oligomeric Chloroformates

Polymerizations of the oligomeric chloroformates "A" and "B" were carried out in a simulated plug flow reactor (Examples 2–10). Oligomeric chloroformate "A" was also polymerized in a tubular continuous flow reactor (Example 11). The results obtained in Examples 2–11 are compared with the polymerization of oligomeric chloroformate "C" (Comparative Example 1) and with the polymerization of bisphenol A under standard batch reaction conditions with phosgene (Comparative Examples 2–7). Generally useful operating conditions and preferred operating conditions for the continuous polymerization of oligomeric chloroformates according to the method of the present invention are given in Table 3.

TABLE 3

OPERATING CONDITIONS FOR CONTINUOUS POLYMERIZATION

| Parameter | Range | Preferred Range |
|---|---|---|
| CF Oligomer Mw | 2,000–10,000 daltons | 4,000–8,000 daltons |
| "Net" Chloroformate | 0.04–0.12 M[a] | 0.045–0.08 M[a] |
| Triethylamine catalyst | 0.5–3.0 mole %[b] | 0.8–1.2 mole %[b] |
| Aqueous phase fraction | 0.25–0.40[c] | 0.28–0.38[c] |
| % Excess NaOH | 5–15%[d] | 5–15%[d] |
| Weight % solids | 5–25% (vs CH2Cl2) | 12–22% |
| Temperature | 20–50° C. | 30–45° C. |
| Pressure | 0–200 psig | 0–100 psig |

[a]M = mole chloroformate groups per liter of organic phase.
[b]Mole % refers to the number of moles of triethylamine expressed as a percentage of moles of bisphenol-derived repeat units.
[c]Volume of the aqueous phase expressed as a percentage of the total volume
[d]mole percent excess over the stoichiometric requirement of 1 mole NaOH per mole of hydroxy group + two moles of NaOH per mole of net chloroformate group in the oligomer feed mixture.

A "simulated plug flow reactor" was utilized to demonstrate the process of the invention. Reactions were conducted in a 500 mL agitated Morton flask equipped with a heating mantle or water bath, a TEFLON paddle-type agitator, a reflux condenser, a pH electrode, and ports for rapid addition of caustic (NaOH solution) and catalyst. The reactor was initially charged with 100 mL of the oligomeric chloroformate solution "A", "B" or "C" (prepared in advance) and brought to the desired starting reaction temperature using the heating mantle or the water bath. Agitation was started. At time zero, the reactor was charged rapidly with an aqueous solution containing NaCl and all of the NaOH used in the polymerization, and the triethylamine catalyst. Samples were taken every 30 seconds until no residual chloroformate was detected with commercial phosgene detection paper. This method of conducting the polymerization reaction was designated a "simulated plug flow reaction" because the reactor contents represent a packet of fluid as it passes through a plug flow reactor. The polymerization time was taken to be the time of the first sample for which no chloroformate was detected. Each sample was quenched in 1 N HCl in order to inhibit any potential reaction between chloroformate and aromatic hydroxyl groups and to force all residual monomer and endcap into the organic phase. The organic phase was then analyzed by GPC to obtain values for weight average ($M_w$) and number average ($M_n$) molecular using polystyrene standards. The samples were assayed for residual aromatic hydroxyl and free BPA by $^{31}P$-NMR after derivatization with 2-chloro-1, 3,2-dioxaphospholane. Data for Examples 2–10 and Comparative Example 1 are gathered in Table 4. Values given as "parts per million" (ppm) represent milligrams of component per kilogram of isolated, dried, solid resin. The polycarbonates were isolated from methylene chloride solution by evaporation of the methylene chloride in hot water under conditions of high shear. These results show that the polymerization reaction may be run under a variety of operating conditions to yield product that is substantially free of aromatic hydroxyl groups under conditions of relatively short reaction times (about 10 minutes or less). The data further illustrate the importance of having a net chloroformate concentration in excess of about 0.04 moles chloroformate group per liter of the solvent employed in the interfacial polymerization step (Compare Examples 2–10 with Comparative Example 1).

TABLE 4

POLYMERIZATION OF CHLOROFORMATE OLIGOMERS UNDER SIMULATED PLUG FLOW POLYMERIZATION CONDITIONS

| Example | CF | Gross [CF][a] | Net [CF][b] | Starting Oligomer $M_w$ | Agitation rate[c] | mole % TEA[d] | % Excess NaOH[e] | Temp° C. | Volume Frac. Aqueous[e] | Polym. time (minutes) | Product $M_w$ | $M_w/M_n$ | ppm residual OH | ppm residual BPA |
|---|---|---|---|---|---|---|---|---|---|---|---|---|---|---|
| 2 | A | 0.179 | 0.048 | 7,080 | 320 | 0.8 | 5 | 35 | 0.33 | 4 | 36,970 | 2.64 | <5 | <30 |
| 3 | A | 0.179 | 0.048 | 7,080 | 320 | 1.2 | 5 | 20 | 0.25 | 4 | 37,010 | 2.65 | <5 | <30 |
| 4 | A | 0.179 | 0.048 | 7,080 | 170 | 0.8 | 5 | 20 | 0.33 | 12 | 35,460 | 2.59 | <5 | <30 |
| 5 | A | 0.179 | 0.048 | 7,080 | 170 | 1.2 | 15 | 20 | 0.33 | 7.5 | 36,590 | 2.61 | <5 | <30 |
| 6 | A | 0.179 | 0.048 | 7,080 | 205 | 1 | 10 | 27.5 | 0.29 | 7 | 36,040 | 2.60 | <5 | 40 |
| 7 | B | 0.234 | 0.124 | 3,900 | 320 | 1.2 | 15 | 35 | 0.25 | 7 | 34,640 | 2.68 | <5 | <30 |
| 8 | B | 0.234 | 0.124 | 3,900 | 320 | 0.8 | 5 | 35 | 0.25 | 5.5 | 36,190 | 2.65 | <5 | <30 |
| 9 | B | 0.234 | 0.124 | 3,900 | 320 | 0.8 | 15 | 20 | 0.33 | 4 | 37,180 | 2.65 | 6 | <30 |
| 10 | B | 0.234 | 0.124 | 3,900 | 320 | 1.2 | 5 | 20 | 0.33 | 4 | 38,310 | 2.69 | 11 | <30 |
| CE-1 | C | 0.150 | 0.034 | 6,650 | 320 | 1.0 | 10 | 20–25 | 0.33 | 2 | 31,890 | 2.58 | >500[g] | 10,000[h] |

[a]moles chloroformate groups per liter of organic phase
[b]moles of chloroformate groups minus moles of hydroxy groups per liter of organic phase
[c]agitation speed in revolutions per minute (rpm)
[d]mole % TEA (triethylamine) per mole of BPA-derived repeat units present
[e]mole percent excess over the stoichiometric requirement of 1 mole NaOH per mole of hydroxy group + two moles of NaOH per mole of net chloroformate group in the oligomer feed mixture.
[e]Volume fraction of the aqueous phase relative to the total volume of the reaction mixture.
[f]"CE-1" is comparative Example 1.
[g]Greater than 500 parts per million residual aromatic OH groups present.
[h]based on GPC area counts: BPA relative to polymer.

Example 11

Continuous Polymerization in a Tubular Reactor

The tubular reactor employed comprised nine mixing sections each of which was followed by a "residence time" section. The mixing sections and their positions along the length of the tubular reactor were: Mixing Sections No.s 1 and 2 each comprised a 3/16" o.d. (3/16 of an inch outer diameter) by 4⅞ inch long KO-FLO® mixer of the KENICS®-type followed by a ¼" o.d. by 7 inch long KO-FLO® static mixer; Mixing Sections No.s 3–7 (5 sections) each comprised a seven inch length of ⅛" i.d. TEFLON tubing, each length of TEFLON tubing being fitted with a TEFLON mixing insert capable of generating high shear; Mixing Sections No.s 8 and 9 (two sections), each section comprising a ¼" o.d. KO-FLO mixer. The "residence time" sections followed each of the mixing sections mentioned. Each of the first eight "residence time" sections consisted of a 10 feet length of copper tubing having an outer diameter (o.d.) of ¼" (0.25 inches); the ninth residence time section consisted of a TEFLON tube having an outer diameter of ¼" (0.25 inches) and a length of 18 feet. The total volume of the tubular reactor system comprising the 9 mixing sections and the 9 "residence time" sections was 465 milliliters (mL). No part of the tubular reactor was insulated. The KO-FLO static mixers are designed primarily for blending and not for achieving high intensity mixing. Further, the "residence time" sections of tubing provided negligible additional mixing. The tubular reactor was continuously fed at the Mixing Section No. 1 end. Three separate feed streams were introduced: Feed No. 1, the methylene chloride solution of oligomeric chloroformate "A" prepared in Example 1; Feed No. 2, an aqueous solution of sodium hydroxide and sodium chloride; and Feed No. 3, a catalyst stream (triethylamine in methylene chloride solution). Optionally, the reactor may be fed with a two-phase mixture from a continuous oligomerization reactor with additional streams of caustic and catalyst. Table 5 shows operating conditions used for the reaction of Example 11. All feeds were delivered at ambient temperature (22° C.) through metering pumps. The reactor effluent containing the product polycarbonate was collected at the end of the last residence time section and quenched with 1N HCl. The organic phase was then characterized by GPC for the molecular weight distribution. The isolated, dried product polycarbonate was assayed by $^{31}$P-NMR for residual aromatic hydroxyl content, for residual BPA content, and p-cumylphenol endcap content.

TABLE 5

OPERATING CONDITIONS USED IN EXAMPLE 11

| | |
|---|---|
| Feed No. 1 (Organic Feed): | 0.775 gm-mole repeat units/L organic feed |
| | Net [CF]: 0.048 gm-mole/L |
| | Gross [CF]: 0.179 gm-mole/L |
| | 4.2 mole % endcap vs repeat units |
| | (added to oligomerizer) |
| | 76 gm/min feed rate |
| Feed No. 2 (Aqueous Feed): | 1.6 wt % NaOH |
| | 17 wt % NaCl |
| | 36.7 ± 1.1 gm/min aqueous feed rate |
| | 1.069 times stoichiometric NaOH feed rate |
| Feed No. 3 (Catalyst Feed): | 0.0157 gm triethylamine/gm CH$_2$Cl$_2$ |
| | Solution of TEA |
| | 3.9 ± 0.8 gm/min catalyst solution feed rate |
| | 1.037 mole % vs repeat units |

TABLE 5-continued

OPERATING CONDITIONS USED IN EXAMPLE 11

| | |
|---|---|
| Aqueous Phase Fraction: | 0.33 |
| Pressure Drop: | 95–100 psig |
| Residence Time: | 4.8 minutes |

The effluent containing the product polycarbonate composition was sampled three times during the course of the experiment constituting Example 11. Data for the product polycarbonate is gathered below in Table 6. Three samples were taken over an 8-minute period.

TABLE 6

EXAMPLE 11, PRODUCT POLYCARBONATE PROPERTIES

| | |
|---|---|
| $M_w$ | 35,760–36,020 daltons (PS standards) |
| $M_w/M_n$ | 2.66–2.67 |
| Residual ArOH | 7–25 ppm (wt/wt solid polymer) |
| Residual BPA | 228–1150 ppm |
| Residual PCP endcap | <60 ppm |

Thus, this process produces fully capped polymer in less than 10 minutes residence time. It is asserted that by using a feed with a slightly higher net chloroformate level, we would obtain residual BPA levels below the 30 ppm detection limit. "Residual AROH" refers to the total residual aromatic hydroxyl group content of the isolated, dried product polycarbonate. Similarly, "residual BPA" and "Residual PCP endcap" refer to the concentrations of bisphenol A and p-cumylphenol respectively, in the isolated, dried product polycarbonate.

Comparative Examples 2–7 Batch Polymerizations

The following experimental description depicts the steps carried out in Comparative Examples 3, 5, and 7. Comparative Examples 2, 4, and 5 were carried out in an identical fashion with the exception that no "rephosgenation" step was employed.

A reactor equipped as in Example 1 was charged with of BPA (165 grams), CH$_2$Cl$_2$(572 mL), H$_2$O(325 mL), p-cumylphenol (6.907 grams), triethylamine (0.73 grams), and 50 wt % NaOH (5 grams). To the mixture was added phosgene at a rate of 5.0 grams/minute for a period of 15.7 minutes. A solution of fifty percent by weight sodium hydroxide in water (50 wt % NaOH) was added dropwise during the course of the phosgene addition in order to maintain the pH at a set point of 10.5. Upon completion of the phosgene addition a sample of the reaction mixture was removed and quenched with 1N HCl. This sample was designated as the "end of reaction" sample. Then, for examples 3, 5, and 7, additional phosgene (5 grams) was introduced into the reaction mixture. Again, a sufficient amount of 50 wt % NaOH was added to maintain a pH of about 10.5. After completion of this second phosgene addition a second sample of the reaction mixture was removed and quenched with 1N HCl. This sample was designated the "rephosgenation" sample. Data for Comparative Examples 2–7 are gathered below. In each of Comparative Examples 2–7, 1.07 moles of phosgene was employed per mole of BPA without taking into account the phosgene employed during the second phosgenation step ("rephosgenation") which was carried out in Comparative Examples 3, 5, and 7. In Comparative Examples 3, 5, and 7 a total of 1.14 moles phosgene per mole BPA was employed. In Table 7 the heading "ppm residual OH" indicates the concentration expressed as the weight of hydroxyl groups (expressed as parts per million parts of the polycarbonate product) after isolation and drying. Similarly, the heading "ppm residual BPA" indicates the amount of BPA present in the product polycarbonate, said amount of BPA being expressed in parts BPA per million parts of the isolated, dried polycarbonate product.

TABLE 7

COMPARATIVE EXAMPLES

| Example | rephosgenated? | Mw | Mw/Mn | ppm residual OH | ppm residual BPA |
|---|---|---|---|---|---|
| CE-2 | no | 39320 | 2.61 | 47 | <30 |
| CE-3 | yes | 38920 | 2.58 | 9 | <30 |
| CE-4 | no | 38780 | 2.63 | 16 | <30 |
| CE-5 | yes | 39230 | 2.60 | 13 | <30 |
| CE-6 | no | 38540 | 2.61 | 25 | <30 |
| CE-7 | yes | 39010 | 2.61 | 27 | <30 |

The data in Table 7 illustrate that the polydispersity ($M_w/M_n$) obtained in both the simulated plug flow reactions and the tube reactions is comparable to that obtained under batch conditions. It is also noted that under batch conditions, residual aromatic hydroxyls are present even when a significant excess of phosgene is employed. Thus the method of the present invention is seen to provide an additional benefit of limiting the amount of excess phosgene which must be employed in order to achieve low levels of residual hydroxyl groups.

The invention has been described in detail with particular reference to preferred embodiments thereof, but it will be understood by those skilled in the art that variations and modifications can be effected within the spirit and scope of the invention.

What is claimed is:

1. A method of making an aromatic polycarbonate, said method comprising contacting under interfacial polymerization conditions a solution comprising an oligomeric chloroformate with an acid acceptor and a catalyst, said oligomeric chloroformate solution having a gross concentration of chloroformate groups, a total concentration of aromatic hydroxyl groups, and a net concentration of chloroformate groups, said net concentration of chloroformate groups being the difference between the gross concentration of chloroformate groups and the total concentration of aromatic hydroxyl groups, said net concentration of chloroformate groups having a value of greater than about 0.04 moles of chloroformate group per liter of said solution.

2. A method according to claim 1 wherein said net concentration of chloroformate groups is in a range between about 0.04 and about 0.12 moles of chloroformate group per liter of said solution.

3. A method according to claim 1 wherein said contacting is carried out in a flow reactor system.

4. A method according to claim 3 wherein said flow reactor system comprises at least one tubular reactor, at least one continuous stirred tank reactor, at least one loop reactor, at least one column reactor, or a combination thereof.

5. A method according to claim 3 wherein said flow reactor system comprises at least one continuous stirred tank reactor.

6. A method according to claim 2 wherein said flow reactor system comprises at least one tubular reactor.

7. A method according to claim 1 wherein said contacting is carried out in a batch reactor system.

8. A method according to claim 7 wherein said batch reactor system is a stirred tank reactor.

9. A method according to claim 1 wherein said oligomeric chloroformate comprises repeat units having structure IV

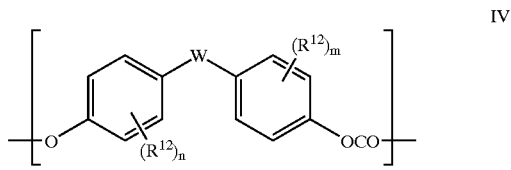

wherein $R^{12}$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

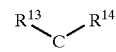

wherein $R^{13}$ and $R^{14}$ are independently a hydrogen atom, $C_1$–$C_{20}$ alkyl group, $C_4$–$C_{20}$ cycloalkyl group, or $C_4$–$C_{20}$ aryl group; or $R^{13}$ and $R^{14}$ together form a $C_4$–$C_{20}$ cycloaliphatic ring which is optionally substituted by one or more $C_1$–$C_{20}$ alkyl, $C_4$–$C_{20}$ aryl, $C_5$–$C_{21}$ aralkyl, $C_5$–$C_{20}$ cycloalkyl groups or a combination thereof.

10. A method according to claim 9 wherein said oligomeric chloroformates comprising repeat units IV are prepared by reaction under interfacial conditions of phosgene with at least one bisphenol having structure V

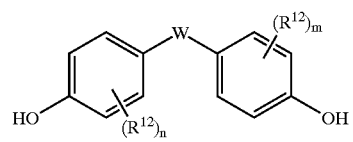

wherein $R^{12}$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

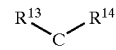

wherein $R^{13}$ and $R^{14}$ are independently a hydrogen atom, $C_1$–$C_{20}$ alkyl group, $C_4$–$C_{20}$ cycloalkyl group, or $C_4$–$C_{20}$ aryl group; or $R^{13}$ and $R^{14}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

11. A method according to claim 10 wherein said bisphenol having structure V is selected from the group consisting of consisting of bisphenol A; 2,2-bis(4-hydroxy-3-methylphenyl)propane; 2,2-bis(4-hydroxy-2-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane; 4,4'-dihydroxy-1,1-biphenyl; 4,4'- dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene and 1,4-bis(2-(4-hydroxy-3-methylphenyl)-2-propyl)benzene.

12. A method according to claim 1 wherein said acid acceptor is selected from the group consisting of alkali metal hydroxides, alkaline earth hydroxides, and mixtures thereof.

13. A method according to claim 12 wherein said alkali metal hydroxides are selected from the group consisting of lithium hydroxide, sodium hydroxide, potassium hydroxide, and mixtures thereof.

14. A method according to claim 1 wherein said catalyst is selected from the group consisting of tertiary amines, quaternary ammonium salts, quaternary phosphonium salts, and mixtures thereof.

15. A method according to claim 1 wherein said catalyst is at least one tertiary amine having structure I

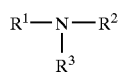

I wherein $R^1$–$R^3$ are independently a bond, $C_1$–$C_{20}$ aliphatic radical, $C_4$–$C_{20}$ cycloalkylaliphatic radical, or a $C_4$–$C_{20}$ aromatic radical.

16. A method according to claim 15 wherein said tertiary amine is selected from the group consisting of triethylamine, tributylamine, N,N-diidiopropyl-N-ethylamine, 4-(N,N-dimethylamino)pyridine, N-ethylmorpholine, 1,4-diazabicyclo[2.2.2]octane, 1,5-diazabicyclco[4.3.0]non-5-ene.

17. A polycarbonate prepared by the method of claim 1.

18. A molded article comprising the product copolymer prepared by the method of claim 1.

19. A method of making an aromatic polycarbonate, said method comprising:

Step (a) continuously introducing into a flow reactor a solution comprising an oligomeric chloroformate, said solution having a gross concentration of chloroformate groups, a total concentration of aromatic hydroxyl groups, and a net concentration of chloroformate groups, said net concentration of chloroformate groups being the difference between the gross concentration of chloroformate groups and the total concentration of aromatic hydroxyl groups, said net concentration of chloroformate groups having a value of greater than 0.04 moles of chloroformate group per liter of said solution;

Step (b) continuously introducing into said flow reactor an acid acceptor and a catalyst; and Step (c) continuously removing an effluent comprising a product aromatic polycarbonate.

20. A method according to claim 19 wherein said net concentration of chloroformate groups is in a range between 0.04 and about 0.12 moles of chloroformate group per liter of said solution.

21. A method according to claim 20 wherein said flow reactor system comprises at least one tubular reactor, at least one continuous stirred tank reactor, at least one loop reactor, at least one column reactor, or a combination thereof.

22. A method according to claim 20 wherein said flow reactor system comprises at least one continuous stirred tank reactor.

23. A method according to claim 20 wherein said flow reactor system comprises at least one tubular reactor.

24. A method according to claim 19 wherein said oligomeric chloroformate comprises repeat units having structure IV

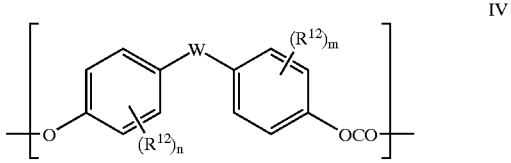

IV wherein $R^{12}$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical, or the group

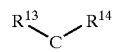

wherein $R^{13}$ and $R^{14}$ are independently a hydrogen atom, $C_1$–$C_{20}$ alkyl group, $C_4$–$C_{20}$ cycloalkyl group, or $C_4$–$C_{20}$ aryl group; or $R^{13}$ and $R^{14}$ together form a $C_4$–$C_{20}$ cycloaliphatic ring which is cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

25. A method of preparing bisphenol A polycarbonate, said method comprising

Step (a) continuously introducing into a flow reactor a methylene chloride solution comprising an oligomeric chloroformate, said solution having a gross concentration of chloroformate groups, a total concentration of aromatic hydroxyl groups, and a net concentration of chloroformate groups, said net concentration of chloroformate groups being the difference between the gross concentration of chloroformate groups and the total concentration of aromatic hydroxyl groups, said net concentration of chloroformate groups having a value between 0.04 and about 0.12 moles of chloroformate group per liter of said solution, said oligomeric chloroformate comprising repeat units having structure VII

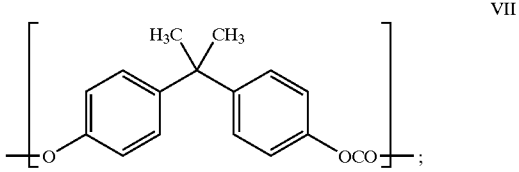

VII

Step (b) continuously introducing into said flow reactor a solution of sodium hydroxide and water, and a solution of triethylamine catalyst in methylene chloride; and Step (c) continuously removing an effluent comprising a product aromatic polycarbonate.

* * * * *

UNITED STATES PATENT AND TRADEMARK OFFICE
CERTIFICATE OF CORRECTION

PATENT NO. : 6,780,961 B2
DATED : August 24, 2004
INVENTOR(S) : James Manio Silva et al.

It is certified that error appears in the above-identified patent and that said Letters Patent is hereby corrected as shown below:

Column 10,
Line 39, "Table 3" should be -- Table 4 --

Column 14,
Line 38, "Examples 2, 4, and 5" should be -- Examples 2, 4, and 6 --

Signed and Sealed this

Twenty-ninth Day of March, 2005

JON W. DUDAS
*Director of the United States Patent and Trademark Office*